United States Patent [19]

Minuhin et al.

[11] Patent Number: 4,800,295
[45] Date of Patent: Jan. 24, 1989

[54] RETRIGGERABLE MONOSTABLE MULTIVIBRATOR

[75] Inventors: Vadim B. Minuhin; Vernon F. Von Deylen, both of Bloomington, Minn.

[73] Assignee: Magnetic Peripherals Inc., Minneapolis, Minn.

[21] Appl. No.: 174,553

[22] Filed: Mar. 29, 1988

Related U.S. Application Data

[63] Continuation-in-part of Ser. No. 11,973, Feb. 6, 1987, Pat. No. 4,760,472.

[51] Int. Cl.[4] .......................... H03K 3/10; H03K 3/033
[52] U.S. Cl. ................................... 307/273; 307/265; 307/267; 307/601; 307/290; 328/207
[58] Field of Search ............... 307/290, 291, 273, 265, 307/266, 267, 272.1, 601, 445; 328/207, 58

[56] References Cited

U.S. PATENT DOCUMENTS

| | | | |
|---|---|---|---|
| 3,761,743 | 9/1973 | Barber | 307/273 |
| 3,768,026 | 10/1973 | Pezzutti | 307/207 |
| 3,979,746 | 9/1976 | Jarrett | 307/273 |
| 4,001,716 | 1/1977 | Swanson | 307/207 |
| 4,061,975 | 12/1977 | Sugai | 307/265 |
| 4,423,338 | 12/1983 | Eardley | 307/273 |
| 4,583,008 | 4/1986 | Grugett | 307/265 |

OTHER PUBLICATIONS

Milman, "Microelectronics-Digital and Analog Circuits and Systems", McGraw-Hill Book Co. (1979) pp. 632-635.

"Motorola-MECL Integrated Circuits" (1987) pp. 3-176 to 3-182.

Primary Examiner—Stanley D. Miller
Assistant Examiner—Nancy Thai
Attorney, Agent, or Firm—Robert M. Angus; Robert A. Genevese

[57] ABSTRACT

A retriggerable monostable multivibrator according to the present invention comprises a bistable device, such as S-R latch, responsive to the output of a pulse former to provide a set output. A propagation chain, comprising a plurality of serially arranged gates, propagates the latch output to form a delayed reset signal. The reset signal operates to reset the bistable latch. Gate means is connected to the true output of the latch, and to the propagation chain, to provide an output pulse for the duration of the true output and reset signal. The gates of the propagation chain are also connected to the pulse former so that the propagation of the reset signal is terminated in the event a second input pulse occurs prior to termination of the reset signal. The latch is again set and the output pulse is thereby extended by a time period equal to the predetermined time period established by the true condition of the latch, the propagation of the reset signal through the propagation chain, and the reset time of latch. Modifications describe variations of the propagation chain as including AND gates, OR gates, NOR gates and inverters.

18 Claims, 2 Drawing Sheets

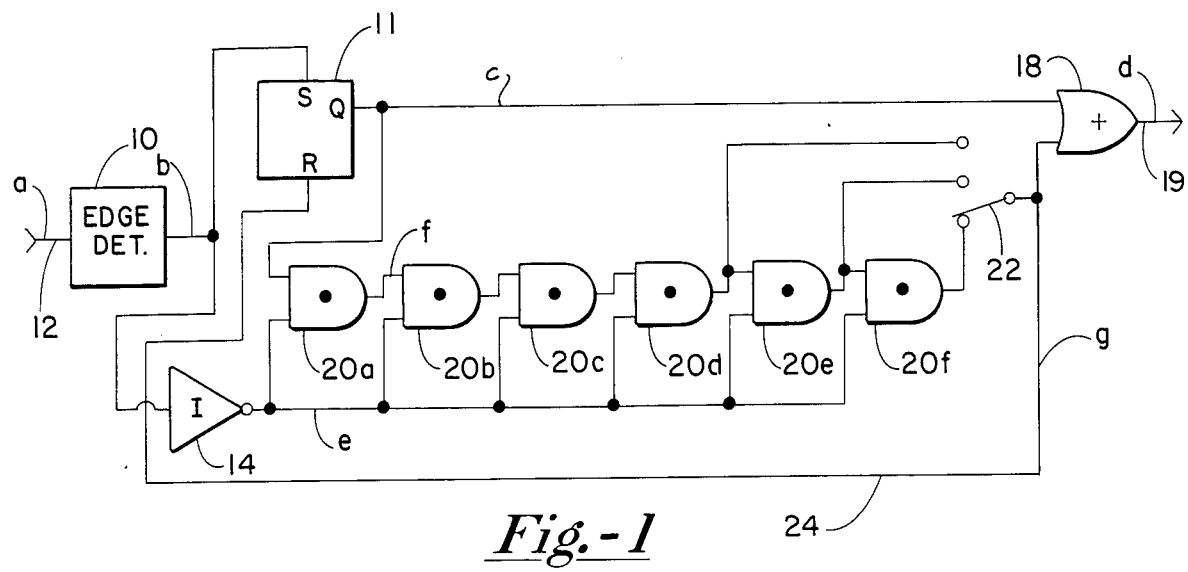
_Fig.-1_
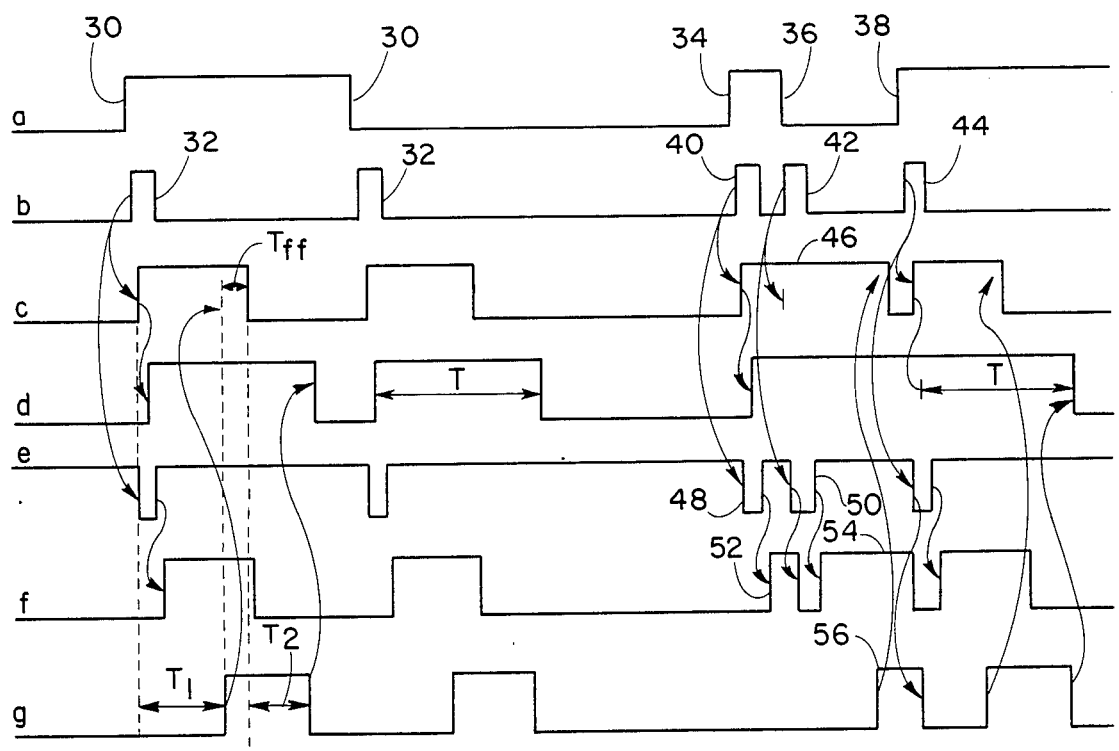
_Fig.-2_

RETRIGGERABLE MONOSTABLE MULTIVIBRATOR

This application is a continuation-in-part of Application Ser. No. 11,973 filed Feb. 6, 1987, and now U.S. Pat. No. 4,760,472, for "Dual Channel Readback Recovery System" by Vadim B. Minuhin and Robert E. Caddy, Jr., and assigned to the same assignee as the present application.

This invention relates to retriggerable monostable multivibrators, as used in computer applications.

A retriggerable monostable multivibrator is a monostable multivibrator which is responsive to an input pulse to produce an output pulse having a predetermined time period, T, and is further responsive to subsequent input pulse occurring during the duration of an output pulse to extend the output pulse by the predetermined time period, T, commencing from the moment of retriggering by the subsequent input pulse. Heretofore, retriggerable monostable multivibrators employed analog techniques using a timing capacitor operating in conjunction with a threshold circuit. Typically, the charged capacitor was rapidly discharged upon receipt of the input pulse and was thereupon permitted to recharge exponentially, such as through an RC circuit. The output pulse was produced by the threshold circuit as the charge on the capacitor fell below, and later rose across a threshold level. A subsequent input pulse, occurring after the capacitor is fully discharged and before the point that the threshold circuit terminates the output pulse, will force the capacitor to a discharged condition to extend the output pulse. Because the capacitor required a finite recovery time, albeit quite short, the multivibrator was not retriggerable until the capacitor was fully discharged. For a further discussion on analog retriggerable monostable multivibrators see Jacob Millman, "Microelectronics—Digital and Analog Circuits and Systems", published by McGraw-Hill Book Company, New York, pp. 633-635 (1979) and "Motorola—MECL Integrated Circuits" published by Motorola, Inc., 1987, pp. 3-176 through 3-182.

The present invention provides a reliable retriggerable monostable multivibrator employing digital components, the width of output pulse being determined by the propagation delay in a propagation chain.

In accordance with the present invention, a retriggerable monostable multivibrator comprises a bistable device is set by an input pulse and reset by a reset pulse. A propagation chain is responsive to the output of the bistable device to propagate a signal which, upon a predetermined delay, provides the reset pulse. The propagation chain is further responsive to the input pulse for cancelling the propagation of the reset pulse. A gate is responsive to the output of the bistable device and to the reset pulse to provide an output pulse.

One feature of the present invention resides in the fact that the propagation chain comprises a plurality of serially connected gates arranged to propagate the output signal from the bistable device through a series of delays formed by the gates. Each of the gates is also connected to the input so as to terminate propagation of the set output signal of the bistable multivibrator in the event another input pulse arrives.

Another feature of the present invention resides in the fact that the propagation chain terminates propagation of the reset signal upon the next input pulse in the event that the input pulse occurs during the predetermined time period established by the multivibrator. In this respect, the output pulse commences upon the setting of the bistable device and terminates upon termination of the reset signal. However, the propagation of the reset signal is terminated in the event of another input pulse sets the multivibrator and reestablishes the time period for the output pulse.

The above and other features of this invention will be more fully understood from the following detailed description, and the accompanying drawings, in which:

FIG. 1 is a block circuit diagram of a retriggerable monostable multivibrator in accordance with the presently preferred embodiment of the present invention;

FIG. 2 is a timing diagram useful in the explanation of the apparatus illustrated in FIG. 1;

Figure 3:
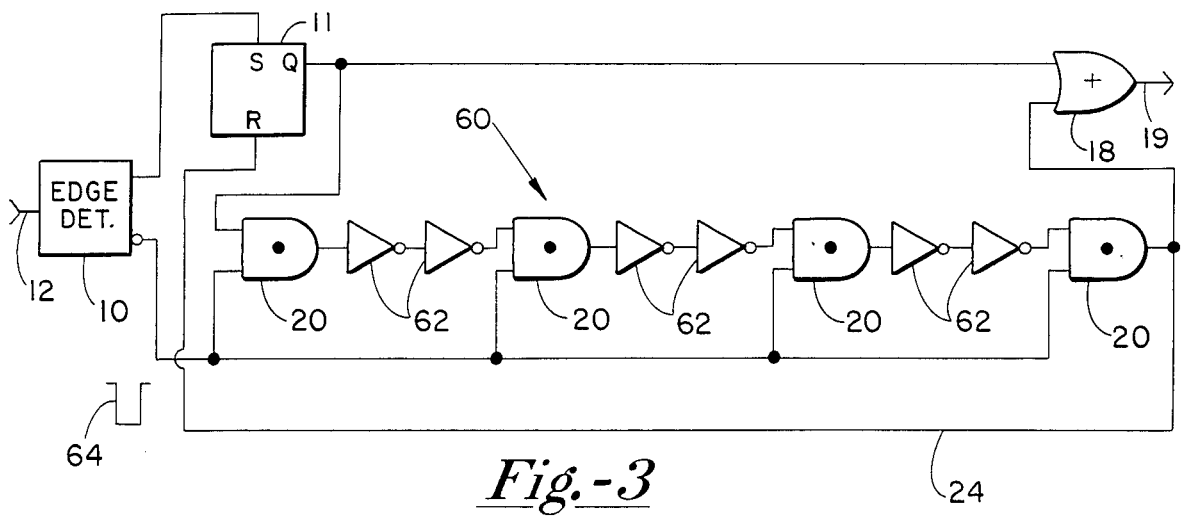
FIGS. 3 and 4 are block circuit diagrams of modifications of a retriggerable monostable multivibrator in accordance with the present invention.

Referring to the drawings, and particularly to FIG. 1, there is illustrated a retriggerable monostable multivibrator in accordance with the presently preferred embodiment of the present invention. The multivibrator comprises a pulse edge detector and pulse former 10 having an input 12 connected to receive data pulses from a source, and having an output connected to the set input of S-R latch 11 and to the input of inverter 14. The true output of latch 11 is provided to an input of the first gate 20a of propagation chain 16, as well as to a first input of OR gate 18. Propagation chain 16 comprises a chain of AND gates 20a, 20b, 20c, ... 20f. AND gate 20a has its two inputs connected to the true output of latch and to the output of inverter 14, whereas AND gates 20b through 20f each have one input connected to the output of the previous AND gate and a second input connected to the output of inverter 14. The output of AND gate 20f is connected to a terminal of switch 22 whose pole is connected to the second input of OR gate 18. OR gate 18 provides an output on lead 19. Conveniently, the outputs of AND gates 20d and 20e may also be connected to separate terminals of switch 22 for purposes to be hereinafter explained. Alternatively, switch 22 may be eliminated as will be explained. The output from the pole of switch 22 is connected via lead 24 to the reset input of latch 11.

Referring to FIG. 2, there is illustrated waveforms useful in explaining the operation of the circuit illustrated in FIG. 1. As will be understood, each AND gate 20 of propagation chain 16 operates as a delay to extend the output pulse width. The input signal at input 12 is shown at waveform a in FIG. 2. Edge detector 10 detects each edge 30 of input signal a and produces a short pulse 32, shown in waveform b. Each pulse of waveform b sets latch 11 to its true condition (if it was not true already) causing the signal of waveform c to go high. Simultaneously, each pulse of waveform b is inverted by inverter 14 to produce waveform e. The high condition of waveform c to one of the inputs of OR gate 18 causes output signal waveform d to go high. At the same time, the signal of waveform c begins to propagate through the propagation chain 16 consisting of AND gates 20. Upon termination of pulse 32 (waveform b), the signal of waveform e goes high causing AND gate 20a to produce a high output (waveform c already being high) as shown as waveform f. Waveform g, like waveform f, is the output of the last AND gate 20f of propagation chain 16. Output waveform d will remain high until both signals c and g to OR gate 18 are low.

The left side of FIG. 2 illustrates the waveforms associated with the circuit of FIG. 1 when the circuit is not called upon to operate in a retriggering mode. As can be seen, the output pulses of waveform d have a pulse width T and are forced high by the positive edge of waveform c and are forced low by the negative edge of waveform g. The time period of the pulses of waveform d is equal to $T_1$, which is the time for propagation of the leading edge of the signal of waveform c through the propagation chain 16 to the output of AND gate 20f, plus $T_{ff}$, which is the time required to reset latch 11, plus $T_2$, which is the time required for the negative edge of the pulses of waveform C to propagate through the propagation chain 16.

The right side of FIG. 2 illustrates the waveform associated with operation of the retriggerable monostable multivibrator of FIG. 1 in a retriggering mode. In this case, edges 34, 36, and 38 of the input waveform a are relatively close together, generating pulses 40, 42, and 44 in waveform b. Pulse 40 generates a pulse 46 in waveform c and causes waveform e to go low. At the next pulse 42, latch 11 will not be reset because waveform g is still in its low state and the latch is already in a set condition due to pulse 40. As a result, pulse 42 is ignored by latch 11. However, inverter 14, which is following exactly waveform b, responds with another negative pulse 50 in waveform e. Upon receipt of the trailing edge of pulse 48 in waveform e, AND gate 20a goes high to produce a short pulse 52 which is terminated when waveform e again goes low by virtue of pulse 50. The resulting pulse 52 thus formed in waveform f, although propagated to the next AND gate, will not survive propagation through the propagation chain due to its eventual meeting with a low condition of waveform e developed by pulse 50. Thus, waveforms c and d will remain high. The high conditions of the signals of waveforms e and f propagate pulse 54 through the propagation chain 16 to eventually produce a pulse 56 in waveform g. Pulse 56 of waveform g resets latch 11 and terminates pulse 46 of waveform c. However, the output signal of waveform d remains high due to the high condition of pulse 56 of waveform g. Subsequently, and assuming for purposes of explanation prior to waveform g going low due to propagation through the propagation chain, positive edge 38 of the input signal waveform a generates pulse 44 from the edge detector and pulse former 10. Pulse 44 initiates a high waveform c (thereby continuing the duration of output waveform d). Pulse 44 also forces waveform e low causing waveform g to go low. Waveform d remains high, however, due to the true condition of latch 11 and the high signal of waveform c. Upon expiration of pulse 44 and the return of waveform e to a high condition, waveform f goes high and the delay period of the propagation continues, measured as in the example on the right side of FIG. 2.

From the foregoing, it is evident that the present invention provides a retriggerable monostable multivibrator which employs digital timing techniques and which is instantaneously retriggerable by an input pulse. Unlike prior analog retriggerable monostable multivibrators which could not be retriggered until the capacitor was discharged, the circuit according to the present invention is retriggerable at any time after the initial triggering. The propagation chain 16 consisting of a plurality of sequentially operated AND gates 20 provide the desired delay. Although six such AND gates 20 are shown, any convenient number may be used to reach the appropriate delay. Each AND gate 20 provides an incremental delay for the propagation of the waveform g. Conveniently, switch 22 may be provided to select which of the several AND gate outputs of the serial propagation chain is used for generation of waveform g. Thus, the desired length, T, of the retriggered pulse may be selected in situ.

FIG. 3 illustrates a modification of a retriggerable monostable multivibrator in accordance with the present invention. In FIG. 3, the output of edge detector 10 has its positive side connected to the set input of S-R latch 11 and its inverse side connected directly to one side of each of the AND gates 20 of propagation chain 60. Additional gate elements, such as pairs of inverter gates 62 are placed in chain 60 between successive AND gates 20.

The apparatus illustrated in FIG. 3 operates similar to that illustrated in FIG. 1. It is important, however, that at least the negative side of the edge detector and pulse former 10 produce a pulse 64 of sufficient length to clear all gate delay elements of the propagation chain 60, in a manner similar to waveform e illustrated in FIG. 2. It may be desirable, for example, to employ a delay chain within the edge detector and pulse former 10 to propagate a sufficiently long pulse width for the negative side of the device.

Figure 4:
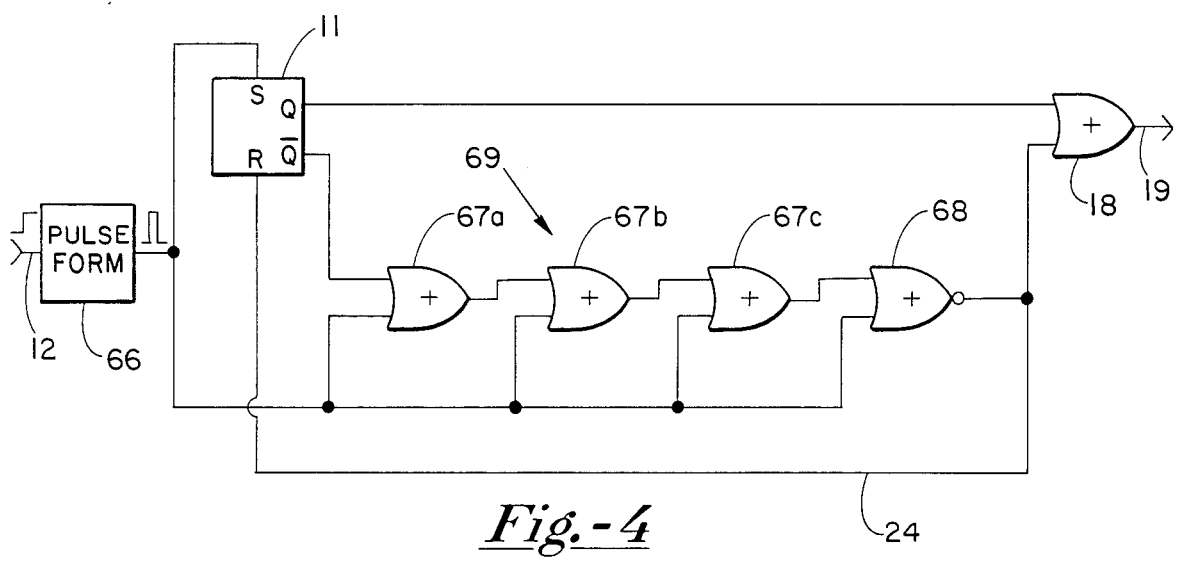

FIG. 4 illustrates another modification of the retriggerable monostable multivibrator according to the present invention. Pulse former 66 provides a short pulse in response edges in the data pulse on lead 12 and supplies the short pulse to the set input of S-R latch 11 and to one input of OR gates 67 and NOR gate 68 of propagation chain 69. The first OR gate 67a has its second input connected to the Q-not output of latch 11, the outputs of each OR gate 67 providing a second input to the next OR gate, with OR gate 67c providing an input to NOR gate 68. NOR gate 68 provides an output to the reset input of latch 11 and to OR gate 18 as heretofor described. The apparatus shown in FIG. 4 operates in a similar manner as the circuits shown in FIGS. 1 and 3, with the OR gates 67 and NOR gate 68 providing the delay elements for the propagation chain.

Figure 5:
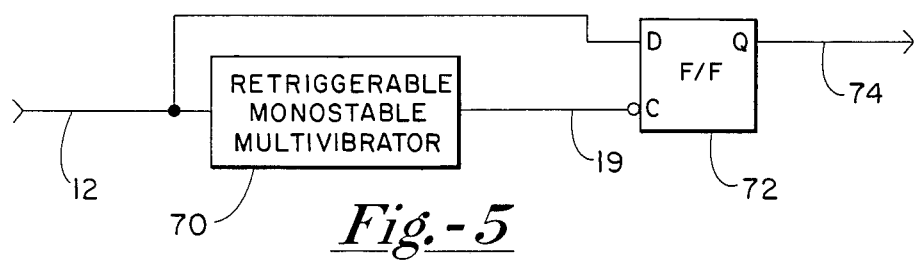
FIG. 5 is a block diagram illustrating the use of the retriggerable monostable multivibrator in accordance with the present invention in a logical filter used for data recovery.

With reference to FIG. 5, the use of the retriggerable monostable multivibrator may be explained. Particularly, as described with reference to FIG. 4 of the aforesaid Application Ser. No. 11,973, retriggerable monostable multivibrator 70 receives data pulse at its input on line 12 and provides an output on line 19 to the clock input of D-type flip-flop 72 which is clocked by negative going edges. The D input of flip-flop 72 receives its input directly from line 12. The retriggerable monostable multivibrator 70 may be the apparatus illustrated in any of FIGS. 1, 3 or 4. Flip-flop 72 provides an output on line 74 to logic used for data recovery, as explained in the aforesaid Application Ser. No. 11,973. Thus, when used in the configuration illustrated in FIG. 5, the retriggerable monostable multivibrator operates as a logical filter.

The present invention thus provides a retriggerable monostable multivibrator, which is accurate in pulse width determination, has an immediate recovery of retriggerability, and employs digital components, thereby overcoming all of the objections previously associated with the analog retriggerable monostable multivibrators. One feature of the present invention resides in the fact that the same gates are used for generating delay of both high and low logic levels, effectively employing each gate twice for generation of the output pulse. This feature reduces the number of gates required, and hence the cost of the circuit.

This invention is not to be limited by the embodiments shown in the drawings and described in the description, which are given by way of example and not of limitation, but only in accordance with the scope of the appended claims.

What is claimed is:

1. A retriggerable monostable multivibrator comprising: bistable means responsive to an input pulse for setting the bistable means to a first output state and responsive to a reset signal for resetting the bistable means to a second output state, said second output state being opposite said first output state; and propagation chain means responsive to the first output state of said bistable means for providing said reset pulse signal upon a predetermined period after said bistable means is set to its first output state, said propagation chain means being responsive to said input pulse for cancelling a reset signal in process of being provided; and output means responsive to said bistable means and to said propagation chain means for producing an output pulse while either said bistable means is in its first output state or said propagation means provides said reset signal.

2. Apparatus according to claim 1 further including input means responsive to a data signal for producing said input pulse, said input means comprising an edge detector and pulse generator for producing input pulses in response to edges of said data signal.

3. Apparatus according to claim 1 wherein said propagation chain means comprises a plurality of gates each having a first input connected to receive said input pulse and having an output, said plurality of gates being arranged in a chain such that the output of each gate except the last gate of said chain is connected to a second input of the next gate of the chain and the output of the last gate of the chain is connected to said output means, and the first gate of said chain having a second input connected to said bistable means.

4. Apparatus according to claim 3 wherein said gates of said chain are AND gates.

5. Apparatus according to claim 3 wherein said gates of said chain are OR gates.

6. Apparatus according to claim 3 wherein at least some of said gates of said chain are inverters.

7. Apparatus according to claim 3 wherein said output means comprises an OR gate.

8. Apparatus according to claim 1 wherein said bistable means comprises an S-R latch having set and reset inputs and a true output.

9. Apparatus according to claim 8 wherein said propagation chain means comprises a plurality of gates each having a first input connected to receive said input pulse and having an output, said plurality of gates being arranged in a chain such that the output of each gate except the last gate of said chain is connected to a second input of the next gate of the chain and the output of the last gate of the chain is connected to said output means, and the first gate of said chain having a second input connected to the true output of said S-R latch.

10. Apparatus according to claim 9 wherein said output means comprises an OR gate having a first input connected to said true output of said S-R latch and a second input connected to the output of the last gate of said chain.

11. Apparatus according to claim 10 further including input means responsive to a data signal for producing said input pulse, said input means comprising an edge detector and pulse generator for producing input pulses in response to edges of said data signal, and means for producing an inverse pulse opposite to said input pulse, said first input of each of said gates being connected to said last-named means to receive said inverse pulse.

12. Apparatus according to claim 9 wherein said gates of said chain are AND gates.

13. Apparatus according to claim 9 wherein said gates of said chain are OR gates.

14. Apparatus according to claim 9 wherein at least some of said gates of said chain are inverters.

15. Apparatus according to claim 9 further including input means responsive to a data signal for producing said input pulse, said input means comprising an edge detector and pulse generator for producing input pulses in response to edges of said data signal, and means for producing an inverse pulse opposite to said input pulse, said first input of each of said gates being connected to said last-named means to receive said inverse pulse.

16. Apparatus according to claim 15 wherein said gates of said chain are AND gates.

17. Apparatus according to claim 15 wherein said gates of said chain are OR gates.

18. Apparatus according to claim 15 wherein at least some of said gates of said chain are inverters.

* * * * *